Patented May 26, 1936

2,042,212

UNITED STATES PATENT OFFICE 2,042,212

PRODUCTION OF TERTIARY ALCOHOLS AND PRODUCTS THEREOF

Richard M. Deanesly, Berkeley, Calif., assignor to Shell Development Company, San Francisco, Calif., a corporation of Delaware No Drawing. Application March 11, 1935, Serial No. 10,457

20 Claims. (Cl. 260—156)

This invention relates to the preparation of tertiary alcohols by the absorption of the corresponding olefines in an aqueous solution of an absorption agent and more particularly to a novel process for the recovery of tertiary alcohols from such absorption media by means of organic solvents for said tertiary alcohols which are substantially immiscible with the absorption media. It is further concerned with the production of new compositions of matter comprising tertiary alcohols dissolved in such organic solvents; such compositions having valuable properties which make them useful as solvents, anti-knock fuels, intermediates in the synthesis of other organic compounds, etc.

The universally accepted method for the recovery of tertiary alcohols from the acid-acting absorption media in which they are prepared is to either neutralize or very highly dilute the absorption product and then subject it to a distillation treatment. I have now found that tertiary alcohols may be more advantageously separated from acid-acting media by extraction with suitable organic solvents. I have developed a commercially practical process, based upon this finding, whereby tertiary alcohols may be manufactured with minimum consumption of absorption agent, so that, for practical purposes, the absorption agent functions as a catalyst in the process.

My process is capable of many widely different modifications. The extraction of the tertiary alcohol, for example, may be carried out either subsequent to, or simultaneously with, the absorption of the corresponding olefine or olefines. In either case batch, intermittent or continuous methods of operation may be adopted.

A simple batch procedure for carrying out my invention may comprise, for example, adding an immiscible organic solvent to an absorption product containing tertiary alcohol, thoroughly agitating the mixture to insure intimate contact between the immiscible phases and separating the solvent phase. The solvent phase containing extracted tertiary alcohol may be used as the final product and as such finds many valuable applications as will be more fully described hereinafter. Alternatively the extracted tertiary alcohol may be recovered from the solvent and the latter re-used for further extraction of the same or another tertiary-base olefine absorption product.

An example of an intermittent method of applying the invention in conjunction with the absorption operation, comprises introducing tertiary-base olefine material into a reaction unit where it is brought into an intimate contact with an absorption agent by agitation or other dispersing means. When the tertiary-base olefinic material is substantially pure, the unabsorbed portion is capable of functioning as a solvent or carrier for at least part of the tertiary alcohol formed by the hydration of the tertiary-base olefine which takes place simultaneously with the absorption. The reaction mixture is permitted to stratify, the unreacted tertiary-base olefine with a substantial amount of the formed tertiary alcohol is separated and subjected to a treatment for the recovery of its alcohol content, while the absorption phase may be charged into another reaction unit and further tertiary-base olefine absorption effected therein with the addition of water. Subsequently, stratification is effected and the resulting acid phase charged into the first reaction unit or into a third reaction unit while the first reaction unit is having added thereto the reactants, tertiary-base olefine and water, and absorption agent. It will be obvious that none of the modifications of my process are restricted to the use of substantially pure tertiary-base olefinic material, however, as it may be executed with such olefinic material containing a wide variety of organic compounds capable of functioning in the same manner as the unabsorbed tertiary-base olefine above described. By the use of less reactive solvents to supplement, or take the place of the tertiary-base olefine in the solvent phase, the absorption of the tertiary-base olefine or olefines present may be carried to substantial completion.

To carry out the process continuously, tertiary-base olefine, water, solvent and absorption agent are charged into a reaction unit and brought into intimate contact therein. After the reaction has been effected, the emulsified mixture is discharged into a separator wherein it stratifies into two liquid phases. The absorption phase is returned to the reaction unit while at least part of the solvent phase is drawn off for the recovery of tertiary alcohol therefrom. The system is thus contolled so that tertiary-base olefine, water and solvent are automatically fed into the reaction unit at a rate sufficient to compensate for the withdrawal of these materials, in the free and combined state, from the system. From time to time it may be necessary to replace the absorption agent removed with the solvent phase, if any is carried off therewith. One simple method of control which insures the fulfillment of the balanced conditions described, comprises feeding in reactants and solvent under sufficient pressure (50–150 lbs. per sq. in. is usually sufficient) to maintain the reactor and separator full at all times. Under these conditions the discharge rate will always equal the feed rate, while the volume and, after equilibrium conditions are reached, the composition of the absorption medium will be maintained substantially constant. Many other modifications of the process are obviously possible without departing from the spirit of the invention.

My invention may be practiced with tertiary-base olefines in a pure state either as individual tertiary-base olefines or pure mixtures of tertiary-base olefines, or with such tertiary-base olefine or olefines in admixture with paraffins and/or other compounds, including less reactive olefines, which may be considered inert in the process. Thus ethylene and/or secondary base olefines, i. e., normal and iso-olefines which yield secondary derivatives, such as propylene, 1-butene, 2-butene, 1-pentene, 2-pentene, 3-methyl-1-butene, and the like, may be present with the tertiary-base olefine or olefines used. Suitable sources of tertiary-base olefines which may be used in my process are hydrocarbons derived from mineral oils, as petroleum, shale oil, and the like, or from mineral oil products, or natural gas, or from coal, peat and like carboniferous natural materials, as well as those derived from animal or vegetable oils, fats and waxes. The olefine or olefines present in such starting materials may be of natural occurrence, the result of a dehydrogenation, distillation, vapor or liquid phase cracking or other pyrogenetic treatment. Furthermore such tertiary-base olefines may comprise hydrocarbon fractions consisting of, or predominating in, hydrocarbons containing the same number of carbon atoms to the molecule or of mixtures of non-isomeric hydrocarbons.

The process is particularly well adapted to the production of tertiary butyl alcohol and/or tertiary amyl alcohol from 2-methyl propene and/or 2-methyl-2-butene and/or 2-methyl-1-butene. It may also be used for the preparation of higher tertiary alcohols such as tertiary hexyl, and the like. It is applicable, furthermore, to processes wherein tertiary alcohols are produced in conjunction with the corresponding and/or other secondary alcohols.

Suitable absorption agents which may be used in my process are inorganic acids, of which dithionic, sulphuric, phosphoric and pyrophosphoric are typical; organic acids such as benzene sulfonic, naphthalene sulfonic, toluene sulfonic and homologues and analogues thereof; aqueous solutions or suspensions of acid-acting salts, as sodium bisulfate, ammonium sulfate, and the like; and "acid liquors" such as are obtained by the absorption of olefines of the same or lesser reactivity than the tertiary-base olefine or olefines being treated, in mineral-acting acid compounds such as the above.

The concentrations in which such mineral-acting acid absorption agents are customarily used for the absorption of tertiary-base olefines vary depending upon the tertiary-base olefine or olefines involved, their concentration and the temperature at which the absorption is carried out. While such conventional concentrations may be successfully used in the practice of my invention, I have found that a departure from prior art practice in certain respects offers decided advantages. With tertiary-base olefines, hydration takes place substantially simultaneously with their absorption so conventional procedures usually result in a variable, and progressively increasing, ratio of acid-acting absorption agent to water in the absorption medium. This may not only interfere with the olefine absorption as well as with the extraction of the tertiary alcohol produced but also may, under extreme conditions, lead to undesirable side reactions such as polymerization of tertiary-base olefines and/or absorption of less reactive olefines. It is advantageous therefore, particularly in intermittent and continuous methods of operation, to control the ratio of acid-acting absorption agent to water in the absorption medium by the addition of water during the tertiary-base olefine absorption. When the absorption agent is sulfuric acid ratios of free acid to free acid plus water within the range of 0.5 to about 0.9 by weight, or more preferably of about 0.6 to about 0.8, may be used. As has already been pointed out a very desirable method of operation, necessarily involving such a maintained ratio of absorption agent to water, comprises maintaining the absorption phase substantially constant in both composition and volume, once the process is initiated. For all practical purposes, the absorption phase can be considered, under these conditions, a part of the reaction unit due to its substantially unvarying character and hence may be used to effect the hydration of theoretically infinite quantities of tertiary-base olefines. Under these conditions the absorption phase will normally contain, absorption agent, water and tertiary alcohol, the latter being present in an amount representing saturation of the absorption phase with respect to the solvent phase present. The absorption phase may also contain small amounts of unreacted tertiary-base olefine and/or other organic compounds used as solvent.

The solvent chosen should, preferably, be inert under the conditions of its use and, where the tertiary alcohol is to be subsequently recovered from the solvent, may advantageously be of a type which does not form an azeotropic mixture with the tertiary alcohol so that the separation may be effected with minimum difficulty, as, for example, by simple distillation. Suitable solvents are: aliphatic hydrocarbons, such as the unabsorbed portion of the tertiary-base olefin being treated, as has already been mentioned, or the less reactive olefinic and/or paraffinic components of tertiary-base olefine containing hydrocarbon fractions, or other petroleum fractions, and the like, or substantially pure aliphatic hydrocarbons, as liquefied propane, normal or isobutane, pentane, hexane, cyclohexane, and the like, or the corresponding olefines such as propylene, 1-butene, 2-butene, 1-pentene, 2-pentene, 3-methyl-1-butene, and the like or olefine polymers such as di and/or tri isobutylene, isoamylene polymers, etc.; or aromatic hydrocarbons of which benzene, toluene and hydrogenated naphthalene are typical. Relatively water insoluble ethers such as ethyl ether, methyl-butyl ether, ethyl-isobutyl ether, and the like, are also suitable. Other less stable solvents such as carbon tetrachloride, chloroform, dichlorethylene, trichlor and tetrachlorethane, chlorbenzene, the propyl and butyl chlorides and the like, may be used although, under the most carefully controlled conditions of application, they are subject to slow decomposition with liberation of hydrochloric acid which in some cases may lead to undesirable side reactions with the olefines present. The solvent may be initially present, either wholly or in part, in admixture with the tertiary-base olefine or olefines used as starting material, or may be added thereto before, during or after the absorption treatment.

The solvents which may be used vary in their capacity for removing the same or different tertiary alcohols and the amount which will be required to effect the desired result in any given case will vary correspondingly. The phase distribution of the tertiary alcohol or alcohols between the solvent phase and the absorption phase will depend upon the composition of these phases. Important among the factors which influence the composition of the two phases are; the ratio of tertiary-base olefins or olefines to water, and the ratio of absorption agent to water. When operating by the previously described preferred methods in which the volume and composition of the absorption phase are maintained substantially constant it will be seen that when one of these ratios is fixed the other also becomes fixed.

The first of these ratios may be the controlling factor in determining tertiary alcohol formation and where unabsorbed tertiary-base olefine is to be used as the solvent phase for removing tertiary alcohol it is desirable to maintain a molar ratio of tertiary-base olefine to water greater than one. But where complete tertiary-base olefine absorption is desired molar ratios of one or less are necessary.

As the ratio of absorption agent to water is reduced, the proportion of tertiary alcohol present in the solvent phase is increased. This is illustrated by the following table which shows the surprising effect which the addition of water has in decreasing the solubility of tertiary butyl alcohol in an aqueous sulfuric acid solution.

|  | Charge (mols) | | Reaction product (mols) | | | |
| --- | --- | --- | --- | --- | --- | --- |
|  | No water added | Water added after absorption | No water added | | Water added after absorption | |
|  |  |  | Upper layer | Lower layer | Upper layer | Lower layer |
| 2-methyl propene | 50.0 | 50.0 | 1.0 | 0.2 | 1.4 | trace |
| Other hydrocarbons (secondary butylenes 77.9%). (butanes 22.1%). | 51.0 | 51.5 | 42.0 | 11.0 | 51.0 | trace |
| $H_2SO_4$ | 20.5 | 20.5 | 0.3 | 20.2 | 0.38 | 20.12 |
| Water— present during absorption | 78.6 | 78.6 |  |  |  |  |
| added after absorption | none | 333.0 |  |  |  |  |
| Total | 78.6 | 411.6 | very little | 30.0 | 9.7 | 353.0 |
| Tertiary butyl alcohol | 0 | 0 | 3.8 | 45.0 | 28.0 | 21.1 |

Advantage may be taken of this unexpected shifting of the tertiary butyl alcohol partition by dilution to aid in the recovery of this alcohol. On the other hand, however, as the ratio of absorption agent to water is reduced the rate of absorption of tertiary-base olefines is also reduced. When employing intermittent or continuous methods of operation I prefer, therefore, to avoid excessive dilutions which render the absorption agent ineffective for further olefine absorption.

The phase distribution of the tertiary alcohol may be further changed by the addition of salting out agents such, for example, as sodium sulfate, ammonium sulfate, ammonium acid sulfate, mono-ammonium phosphate, and other salts soluble in the absorption agent used, whereby the proportion of tertiary alcohol in the solvent phase may be materially increased. Such salting out agents may be present during the olefine absorption step or may be added thereafter before separation of the phases.

The extent to which it is desirable to reduce the tertiary alcohol content of the absorption phase will depend upon the particular method adopted for putting the invention into practice. When the absorption phase is to be reused for further tertiary-base olefine absorption as in intermittent and continuous processes, there is usually no advantage to be gained by exhaustive extraction as the presence of tertiary alcohol, except in very excessive amounts, does not interfere with the absorption of tertiary-base olefines and in fact may be advantageous in eliminating the induction period usually encountered in such operations. In such methods of operation, I prefer to carry out the process as a purely catalytic reaction, maintaining the composition and volume of the absorption phase substantially constant and saturated with respect to the tertiary alcohol being produced so that, as tertiary-base olefine, water and solvent are fed in at the same rate they are withdrawn, the tertiary alcohol formed is substantially completely transferred to the solvent phase present and removed therewith. To this end, I find it preferable to saturate the absorption medium with tertiary alcohol before starting to absorb olefine. The same result may be accomplished, however, by allowing the tertiary alcohol content of the absorption phase to build up by absorption of the corresponding olefine until a concentration is reached representing the desired saturation. With tertiary butyl alcohol, this concentration is materially higher than that required for the less water soluble alcohols such as tertiary amyl, hexyl and the like.

The extraction operation may be effected at room temperature or at higher or lower temperatures when such are used in the absorption step. Superatmospheric pressures may be employed as, for example, where low-boiling solvents are used. Severe conditions which promote reaction between the extractant and the absorption agent and/or cause decomposition of the tertiary alcohol being produced are, however, preferably avoided. In any case, the liquid phase removal of the tertiary alcohol which is effected by my process offers many advantages over prior distillation methods The tertiary alcohol containing solvent may be separated from the extracted acid liquor in any conventional manner. Resort may be had, for example, to centrifugal separation, stratification and decantation, or other well-known methods of separating immiscible phases.

The tertiary alcohol may be recovered from the extractant in any convenient way such, for example, as by water washing, dilution and/or distillation, and the like.

Whether or not tertiary alcohol is to be recovered from the solvent, it may be advantageous, particularly in intermittent and continuous methods of operation, to carry out an alcohol recovery treatment on a part of the absorption medium. When a small part of the absorption medium is separated and subjected to the conventional dilution and distillation for the recovery of its tertiary alcohol content, excessive accumulation of entrained organic matter therein may be prevented while by properly proportioning the amount so treated all the advantages of a catalytic process may be retained. The absorption medium withdrawn for such treatment may be separated before or after extraction or may represent a part of the emulsified mixture of solvent and absorption phases before they are stratified and separated. In any case, the proportion withdrawn is preferably limited to such an amount as does not introduce an excess of water into the reactor when the resulting diluted absorption agent is returned to the system. In other words, the aqueous content of the absorption agent after distillation should be such as may be used to replace, in whole or in part, the water which would otherwise be added with the tertiary-base olefine to produce alcohol.

The following example illustrates certain specific embodiments of my invention in which petroleum hydrocarbons were used to remove tertiary butyl alcohol from a sulfuric acid solution. But it will be understood that I am not to be limited thereto as my invention is capable of many widely different modifications and by suitable adjustment of operating conditions, as will be evident to those skilled in the art of synthetic alcohol manufacture, may be used to recover other tertiary alcohols from other-acid-acting media with similar and/or other suitable organic solvents.

*Example I*

Sulfuric acid, diluted to about 20% to 30% acidity and a substantially pure butane-butene fraction containing about 25% 2-methyl propene were introduced continuously into a reactor provided with an efficient stirring device and cooling coils through which a refrigerant was circulated. The reactor at the start of the operations had been charged with 80% sulfuric acid. The isobutylene rate was fixed at 65 gallons per hour but the acid rate was varied, in accordance with analytical tests of the reactor's contents, so that a ratio of free sulfuric acid to free sulfuric acid plus water of about 0.75 to 0.85 was maintained in the reactor.

The reactor contents were drawn off to a separator at a rate equivalent to the feed and the phases stratified and separated. The hydrocarbon phase, after treatment with caustic to neutralize the free sulfuric acid present, was continuously and wholly fed to a stripping column where the tertiary butyl alcohol content was removed as bottoms. The acid phase was divided, a part being returned to the reactor while the remainder was diluted and pumped to a flash evaporator. The proportion returned directly to the reactor was regulated in accordance with the analytical tests of the reactor's contents so that no undue accumulation of dilute acid from the flash evaporator occurred. In other words, the composition and volume of the reactor contents were maintained substantially constant after the contents had attained substantial saturation with respect to the tertiary butyl alcohol.

In the flash evaporator the acid, diluted in the conventional manner, was separated as bottoms from the tertiary butyl alcohol and any unreacted 2-methyl propene dissolved therein. The alcohol was added to that recovered from the hydrocarbon layer while the 2-methyl propene was returned through a compressor to the reactor.

The yields obtained with the above mentioned rates of feed were 18 gallons of anhydrous tertiary butyl alcohol per hour from the acid layer and 16 gallons per hour from the hydrocarbon layer, or a total of 34 gallons per hour equivalent to a yield of 52.2% of the theoretical based upon the 2-methyl propene available. The acid loss, due to its slight solubility in the existing hydrocarbons, was very small and could be made up by the addition of any available dilute sulfuric acid solution.

Whatever the mode of operation chosen for carrying out the invention, it is evident that it offers marked advantages over prior distillation methods of tertiary alcohol recovery. Not only is the necessity for regeneration of the absorption agent, such as sulfuric acid, eliminated, but also better yields of tertiary alcohols are obtained whether or not resort is had to the dilution procedure. This latter advantage of the extraction process may be attributed to the fact that the tertiary alcohol is almost completely freed of acid-acting compounds before it is subjected to heating or distillation. Consequently back decomposition to olefine and other undesirable reactions leading to alcohol losses are materially reduced.

My process also furnishes a ready means for the preparation of valuable new compositions of matter consisting of solutions of tertiary alcohols, particularly tertiary butyl alcohol, in organic solvents, more especially hydrocarbon solvents. Such compositions may advantageously be used as solvents or thinners in lacquers and the like, as they have a latent solvent power for many cellulose derivatives and a much higher miscibility with solutions thereof than have the usual hydrocarbon thinners. They may also be used as solvents for resins, gums, rubber and the like.

They are useful as motor fuels or motor fuel components. A particularly valuable product for such use is obtained by substituting isobutylene polymers, or hydrogenation products thereof, for the butane-butene mixture used as extractant in Example I. The resulting product containing typically about 10 to 50% by weight of tertiary butyl alcohol has a very high anti-knock value. Such products may also be used for blending other alcohols, such as ethyl alcohol, with gasoline.

These products offer many advantages over the pure alcohols ordinarily produced where the alcohol is to be employed for further synthesis. Thus in exothermic reactions, such as oxidation, for example, the hydrocarbons present may be used to regulate and carry away the heat of reaction. The diluent containing tertiary alcohols also provide many economies where the fluidity of the alcohol or its reaction products are to be maintained.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories advanced as to the advantageous results attained. On the other hand, the invention is to be regarded as limited only by the terms of the accompanying claims, in which it is my intention to claim all novelty inherent therein as broadly as is possible in view of the prior art.

I claim as my invention:

1. In a process of producing an aliphatic tertiary alcohol by simultaneous absorption and hydration of the corresponding olefine in an acid-acting absorption agent, the step of separating from said absorption agent a substantial part of the tertiary alcohol formed by extraction with an organic solvent for said alcohol which is substantially immiscible with said absorption agent under the conditions of absorption and recovering a substantial part of the tertiary alcohol content from the organic solvent.

2. In a process of producing an aliphatic tertiary alcohol by simultaneous absorption and hydration of the corresponding olefine in an acid acting absorption agent, the steps of adding to the olefine absorption product a solvent for said tertiary alcohol capable of forming a separate phase with the absorption medium, separating the resulting substantially immiscible phases, and recovering a substantial part of the tertiary alcohol formed from the solvent phase.

3. The process of producing an aliphatic tertiary alcohol which comprises absorbing and simultaneously hydrating a tertiary-base olefine in an acid-acting absorption medium in the presence of a solvent for the alcohol, stratifying the reaction mixture into a solvent phase containing a substantial amount of the tertiary alcohol formed and an acid-acting phase without dilution of the reaction mixture, and separating the resulting phases.

4. The process of producing an aliphatic tertiary alcohol from the corresponding olefine which comprises absorbing and simultaneously hydrating a part of said olefine in an acid-acting absorption medium in the presence of an excess of said olefine under the conditions of absorption and recovering tertiary alcohol produced thereby by extraction with the remaining unreacted olefine.

5. The process of producing an aliphatic tertiary alcohol in accordance with claim 4 in which the olefine is absorbed in the presence of insufficient water to effect complete hydration thereof.

6. The process of producing an aliphatic tertiary alcohol which comprises absorbing and simultaneously hydrating at least a part of the tertiary-base olefine content of a hydrocarbon mixture containing paraffin and tertiary-base olefine hydrocarbons in an acid-acting absorption medium, stratifying the reaction mixture into a solvent phase comprising said paraffin hydrocarbon and containing a substantial part of the tertiary alcohol formed and an absorption phase without dilution of the absorption mixture.

7. The process of producing an aliphatic tertiary alcohol which comprises absorbing and simultaneously hydrating at least a part of the tertiary-base olefine content of a hydrocarbon fraction consisting predominantly of tertiary-base olefine and paraffin hydrocarbons containing the same number of carbon atoms to the molecule in an acid-acting absorption agent, stratifying the reaction mixture into a solvent phase comprising said paraffin hydrocarbons and containing a substantial part of the tertiary alcohol formed and an absorption phase without dilution of the absorption mixture.

8. The process of producing tertiary butyl alcohol which comprises absorbing and simultaneously hydrating 2-methyl propane in an acid-acting absorption medium, and extracting tertiary butyl alcohol therefrom with an organic solvent which is substantially immiscible with said absorption medium under the conditions of absorption.

9. The process of producing tertiary butyl alcohol which comprises simultaneously absorbing and hydrating 2-methyl propene in an acid-acting absorption medium and removing at least a part of the tertiary butyl alcohol so produced from the substantially undiluted absorption medium in admixture with an organic solvent for tertiary butyl alcohol which is substantially immiscible with said absorption medium under the conditions of absorption.

10. The process of producing tertiary butyl alcohol which comprises simultaneously absorbing and hydrating 2-methyl propene in an acid-acting absorption medium in the presence of a solvent for said alcohol, stratifying the reaction mixture into a solvent phase containing a substantial amount of the tertiary butyl alcohol formed and an acid-acting phase without dilution of the reaction mixture and separating the resulting phases.

11. The process of producing an aliphatic tertiary alcohol which comprises absorbing and simultaneously hydrating the corresponding olefine in an aqueous sulfuric acid solution in the presence of a solvent for said alcohol, stratifying the reaction mixture into a solvent phase containing a substantial amount of the tertiary alcohol formed and a sulphuric acid phase without dilution of the reaction mixture and separating the resulting phases.

12. The process of producing tertiary butyl alcohol which comprises simultaneously absorbing and hydrating 2-methyl propene in an aqueous sulfuric acid solution, and extracting at least a part of the tertiary butyl alcohol produced with an organic solvent therefor which is substantially immiscible with said sulfuric acid solution.

13. The process of producing an aliphatic tertiary alcohol which comprises simultaneously absorbing and hydrating the corresponding olefine in an acid-acting absorption medium in the presence of a solvent for said alcohol, stratifying at least a part of the reaction mixture into a solvent phase containing tertiary alcohol and an acid-acting phase, and recyling the acid-acting phase to the absorption unit.

14. The process of producing an aliphatic tertiary alcohol which comprises simultaneously absorbing and hydrating the corresponding olefine in an acid-acting absorption medium in the presence of a solvent for said alcohol, stratifying at least a part of the reaction mixture into a solvent phase containing tertiary alcohol and an acid-acting phase and recycling the acid-acting phase to the absorption unit while maintaining the composition and volume of said acid-acting phase substantially constant.

15. The process of producing an aliphatic tertiary alcohol which comprises simultaneously absorbing and hydrating the corresponding olefine in an acid-acting absorption medium in the presence of a solvent for said alcohol, stratifying at least a part of the reaction mixture into a solvent phase containing tertiary alcohol and an acid-acting phase and reusing the acid-acting phase for further olefine absorption while maintaining the composition and volume of the absorption medium substantially constant.

16. A continuous process of producing an aliphatic tertiary alcohol which comprises absorbing and simultaneously hydrating a tertiary-base olefine in an acid-acting absorption medium in the presence of a solvent for said alcohol, continuously stratifying the reaction mixture into a solvent phase containing tertiary alcohol and an acid-acting phase without dilution of the reaction mixture and continuously withdrawing at least part of the solvent phase while maintaining the volume and composition of the acid-acting phase substantially constant.

17. A continuous process of producing an aliphatic tertiary alcohol which comprises establishing two contiguous liquid phases, one of said phases comprising a solvent for said tertiary alcohol while the other phase comprises an aqueous solution of a tertiary-base olefine absorption agent, saturating the latter phase with the tertiary alcohol being produced and thereafter feeding into the same the corresponding olefine, water and solvent at a rate sufficient to compensate for their removal in the solvent phase as alcohol, solvent and water.

18. A new composition of matter essentially comprising tertiary butyl alcohol and a hydrocarbon of the class consisting of paraffin and olefine hydrocarbons of substantially only four carbon atoms per molecule and polymers of said olefines substantially free of free acid.

19. A new composition of matter essentially comprising tertiary butyl alcohol and a mixture of butanes and secondary butenes substantially free of free acid.

20. A new composition of matter essentially comprising tertiary butyl alcohol and at least one isobutylene polymer substantially free of free acid.

RICHARD M. DEANESLY.